(12) United States Patent
Flora et al.

(10) Patent No.: US 7,765,630 B2
(45) Date of Patent: Aug. 3, 2010

(54) LOW-PROFILE ROTARY SWEEPER

(75) Inventors: Jonathan J. Flora, Modesto, CA (US);
Douglas W. Flora, Modesto, CA (US);
Douglas J. Lynch, Modesto, CA (US);
Adam L. Benedict, Salida, CA (US);
Pierre J. de Wet, Tyler, TX (US)

(73) Assignee: EXACT, Corp., Modesto, CA (US)

( * ) Notice: Subject to any disclaimer, the term of this patent is extended or adjusted under 35 U.S.C. 154(b) by 1035 days.

(21) Appl. No.: 10/913,784

(22) Filed: Aug. 7, 2004

(65) Prior Publication Data

US 2005/0102779 A1    May 19, 2005

Related U.S. Application Data

(60) Provisional application No. 60/493,694, filed on Aug. 8, 2003.

(51) Int. Cl.
*E01H 1/04* (2006.01)
(52) U.S. Cl. ................................. 15/82; 15/87; 15/340.1
(58) Field of Classification Search ............... 15/82–87, 15/340.1, 340.4; 56/14.1
See application file for complete search history.

(56) References Cited

U.S. PATENT DOCUMENTS

| 1,417,231 | A | * | 5/1922 | Deweese | ..................... 15/356 |
| 3,893,286 | A | * | 7/1975 | Buttram et al. | ............ 56/328.1 |
| 4,290,820 | A | * | 9/1981 | Swisher et al. | .................. 134/6 |
| 4,366,593 | A | * | 1/1983 | Parikh | ......................... 15/52.1 |
| 5,261,139 | A | * | 11/1993 | Lewis | .......................... 15/49.1 |
| 7,131,254 | B2 | * | 11/2006 | Flora et al. | .................. 56/328.1 |

* cited by examiner

*Primary Examiner*—Shay L Karls
(74) *Attorney, Agent, or Firm*—Svendsen Legal, LLC

(57) ABSTRACT

A low-profile sweeper that employs rotary brushes. The low-profile sweeper is especially suited for low overhead clearance applications, as typically found in nut harvesting. The low-profile sweeper has an armature for locating one or more brushes in an array, or attached to a conventional agricultural sweeper. The armature attaches to a chassis or frame of a steerable drive. When used in a parallel oriented array, the brushes rotate in the same, common direction and in substantially the same, common plane of rotation, slightly skewed to avoid contact between the brushes. The bristles of the radial brushes are emanate fro a central hub and are approximately parallel to the plane of rotation. A fan can be utilized to aid the pick-up action of the brushes. The fan is preferably mounted to direct an airstream to the area to be swept. Also, a spray-bar can be attached to the armature or alternatively to the chassis, to aid in dust abatement.

3 Claims, 11 Drawing Sheets

LOW-PROFILE ROTARY SWEEPER

This application claims the benefit of U.S. Provisional Application No. 60/493,694, filed Aug. 8, 2003.

TECHNICAL FIELD

The invention relates to a low-profile sweeper that employs a rotary brush. The apparatus of the invention is especially suited for low overhead clearance applications, as typically found in nut harvesting.

DETAILED DESCRIPTION OF SPECIFIC EMBODIMENTS

Figure 1:
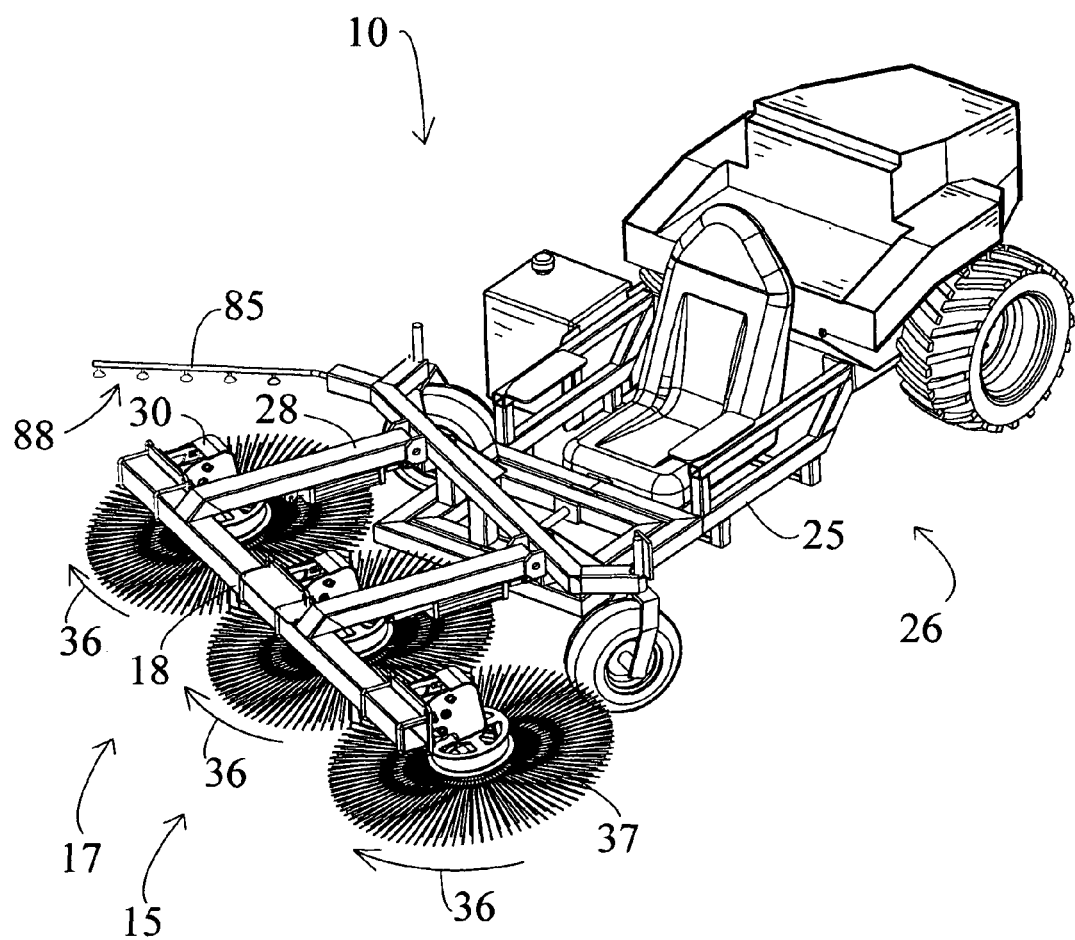
FIG. 1 is a perspective view of a low-profile sweeper, according to an embodiment of the invention.

The present invention provides a low-profile sweeping apparatus, especially suited for use in nut harvesting and similar tasks. FIGS. 1 through 11 show a low-profile sweeper 10, with features of preferred embodiments of the invention.

In a preferable embodiment of the present invention shown in FIGS. 1 through 9, the low-profile sweeper 10 employs a plurality of rotatable brushes 15, which are also referred to herein as "rotary brushes," or simply "brushes." The plurality of rotary brushes are mounted in an array 17 on a brush armature 18. The brush armature mounts to a chassis 25. The chassis preferably includes a steerable drive 26, or similar mechanism for propelling and guiding the low-profile sweeper. Preferably, the brush armature has an armature frame 28 that receives each of the plurality of rotary brushes. Each of the rotary brushes are preferably attached to the brush armature by an angle bracket 30.

Figure 2:
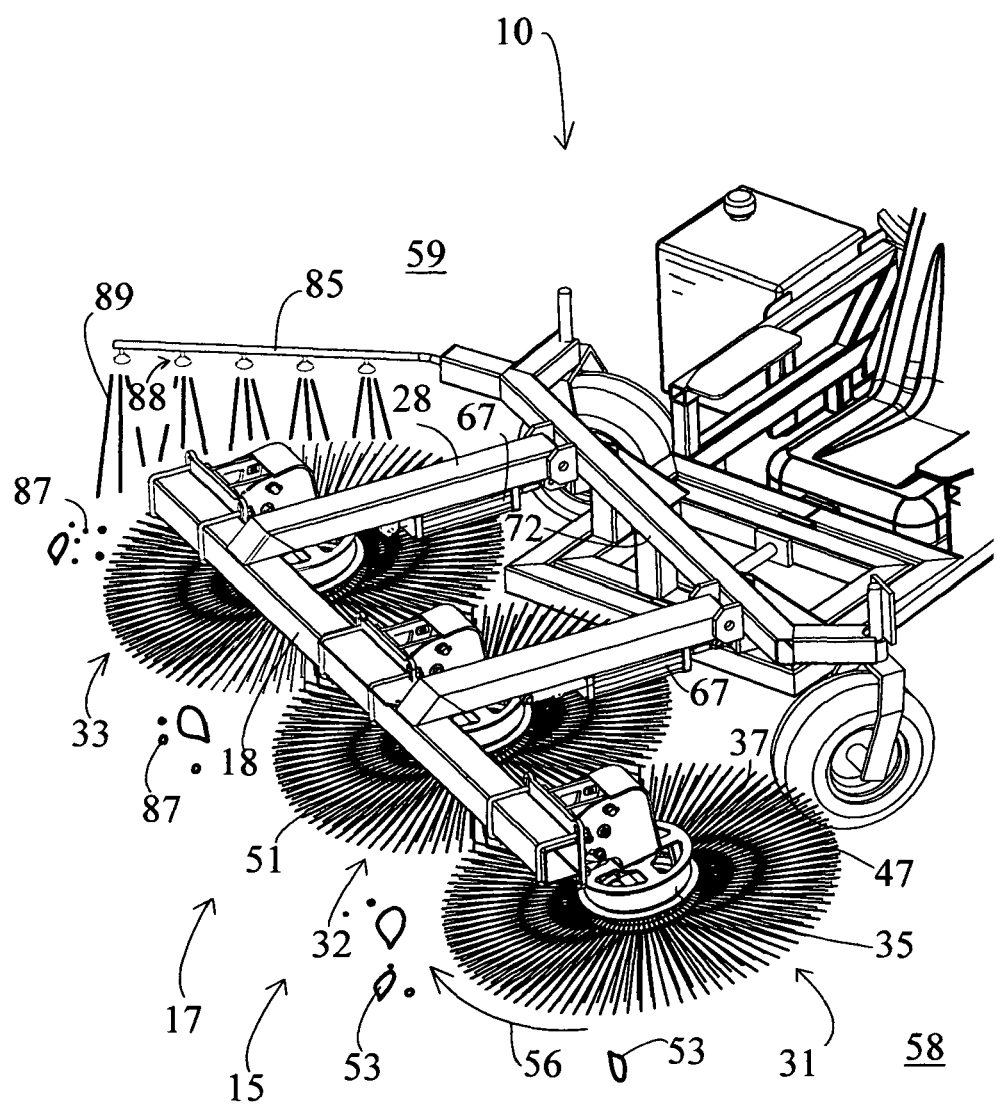
FIG. 2 is a partial perspective view of a low-profile sweeper, according to an embodiment of the invention.

As detailed in FIG. 2, the plurality of rotatable brushes 15, most preferably include three rotary brushes, a first brush 31, a second brush 32 and a third brush 33. The brushes all include a hub 35, centrally located in each brush and rotatably mounted to the angle bracket 30. The brushes rotate in a direction of rotation 36, as also shown in FIG. 2.

For a preferred embodiment of the present invention, as shown in FIGS. 1 through 5, the brushes 15 have bristles 37 that are included in a bristle set 38. For simplicity, FIGS. 6 through 9 show the bristles as solid disks, without the detail of the individual bristles. The bristle set is preferably a narrow stack of conventional, off-the shelf "wafer" brush bristles, as are conventionally employed in "broom reels" or "tube brooms." Most preferably, a polypropylene wafer set for a standard, three foot diameter tube broom is utilized for the bristle set, as manufactured by Three "B" Brush Manufacturing Co., of Lubbock, Tex., U.S.A. The inventors of the present invention found that the orientation of the bristles in the wafer sets performed well with the low-profile sweeper 10, far better than conventional "gutter broom" brush bristle sets. In fact, conventional gutter broom brushes are inoperable as the first brush 31, especially when a "skewed" relationship is needed between neighboring brushes or the brush is needed for operation close to trees and obstructions, as is discussed later herein.

For the bristle set 38, any type, configuration or bristle material, with a preferred structure of the bristles 37 that is substantially "radial" in form, is most preferred. By radial, the bristles emanate from the hub 35. Any such radial brush design should perform nominally well for use with the low-profile sweeper 10. The bristles of the rotary brushes 15 may be plastic, metal, or a combination of conventional bristle materials. The bristles may be pre-manufactured for use with conventional sweepers, or custom built for the specific use with the present invention. The use of the wafer as the preferred bristle set, with its bristles directed radially from an axis of rotation 40, provides superior material pickup and sweeping characteristics. The axis of rotation is shown in FIGS. 4, 5, 8, 9 and 10. The selection of the wafer style of brush is a novel and non-obvious choice, as compared to conventional gutter broom configurations that a person skilled in brush selection would likely make for a supposed optimum brush selection.

Figure 8:
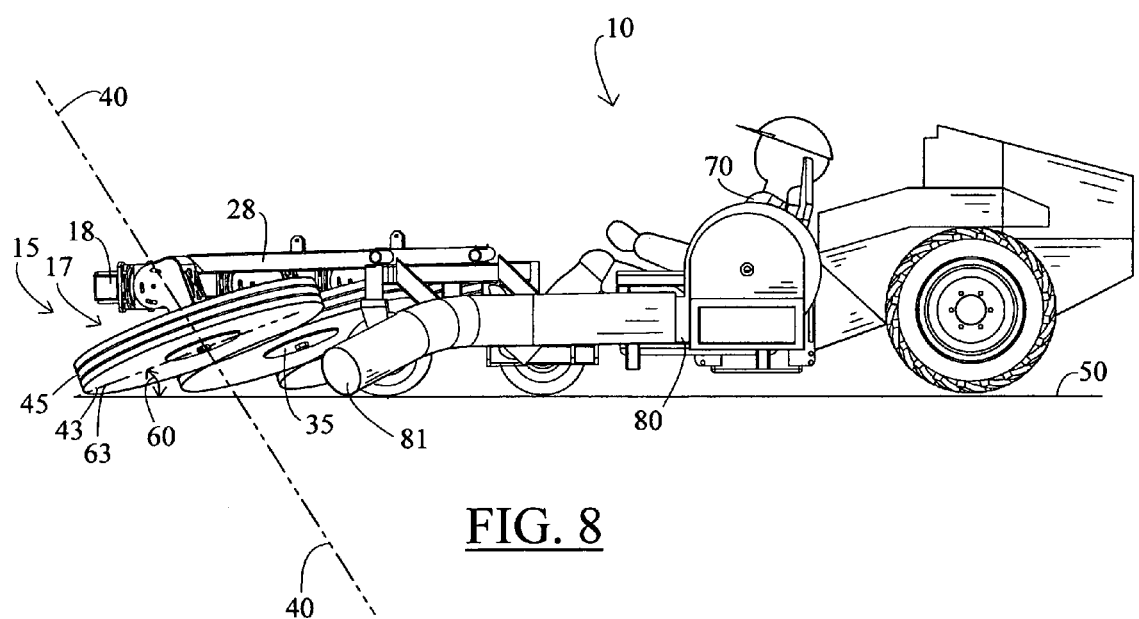
FIG. 8 is a side view of a low-profile sweeper, according to an embodiment of the invention.

As shown in FIG. 8, the brushes 15 meet a ground surface 50 at a contact area 43. The contact area is located proximate to an outer perimeter 45 of the brushes. The outer perimeter of the brushes corresponds to a tip end 47 of the bristle 37. The rotating brushes maintain constant contact between contact area and the ground surface with successive bristles, as the brushes rotate past the contact area. The contact area is at a leading edge 51, along the outer perimeter of the brushes. Any movable item encountered by the rotating bristles, is propelled by the brushes in the direction of rotation 36, along the outer perimeter of the brushes. These items are as most preferred, a harvested material such as tree nuts 53 that have fallen to the ground surface. The low-profile sweeper 10 of the present invention is well suited for the cleaning and sweeping of nuts in nut tree groves or orchards. With the present invention, nuts that have been shaken from the tree, or otherwise fallen to the ground, can be efficiently swept into a windrow 55, typically centered between tree rows. A preferred tree nut is an almond, but an alternative is a walnut, a hazelnut or filbert, a pistachio, or a pecan, to name but a few ground harvested nut varieties, as well known to those skilled in the cultivation of tree nuts.

In a preferred embodiment of the present invention, as shown in FIG. 2, all of the directions of rotation 36 for each of the plurality of rotatable brushes 15 is a common direction of rotation 56. This feature serves to move swept material, such as the tree nuts 53, from an inside sweep area 58, along the outer perimeter 45 of the brushes, to an outside sweep area 59. As discussed above, any number of rotatable brushes could be employed, with three considered optimal, and one, two or four rotary brushes considered as alternatives.

Figure 5:
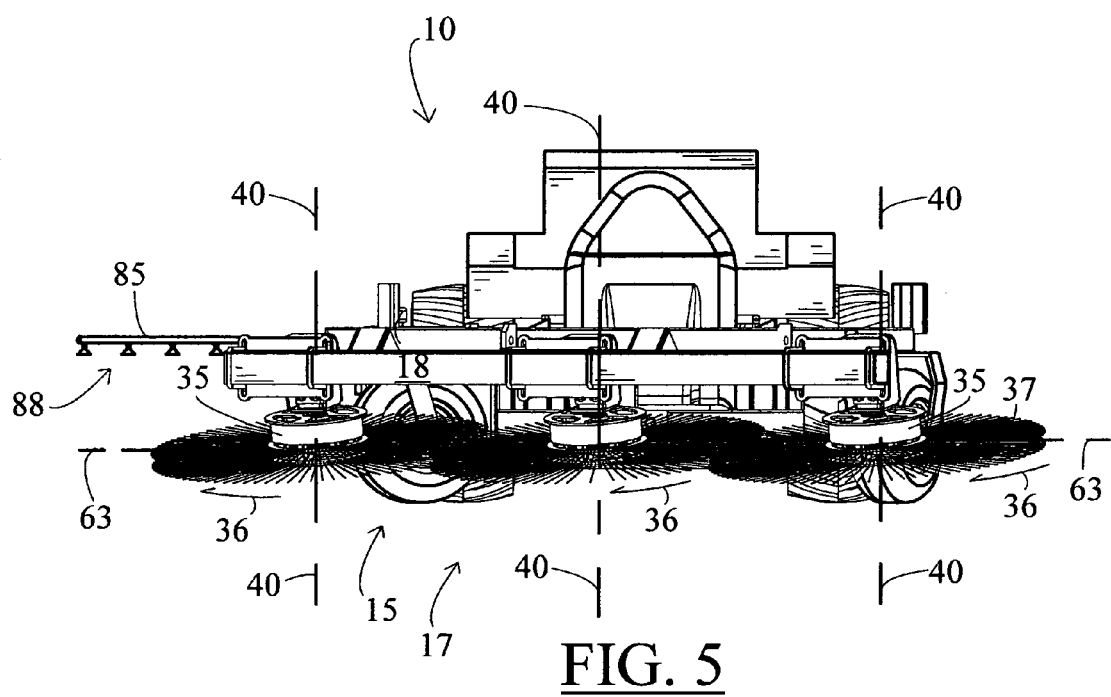
FIG. 5 is a front view of a low-profile sweeper, according to an embodiment of the invention.
Figure 9:
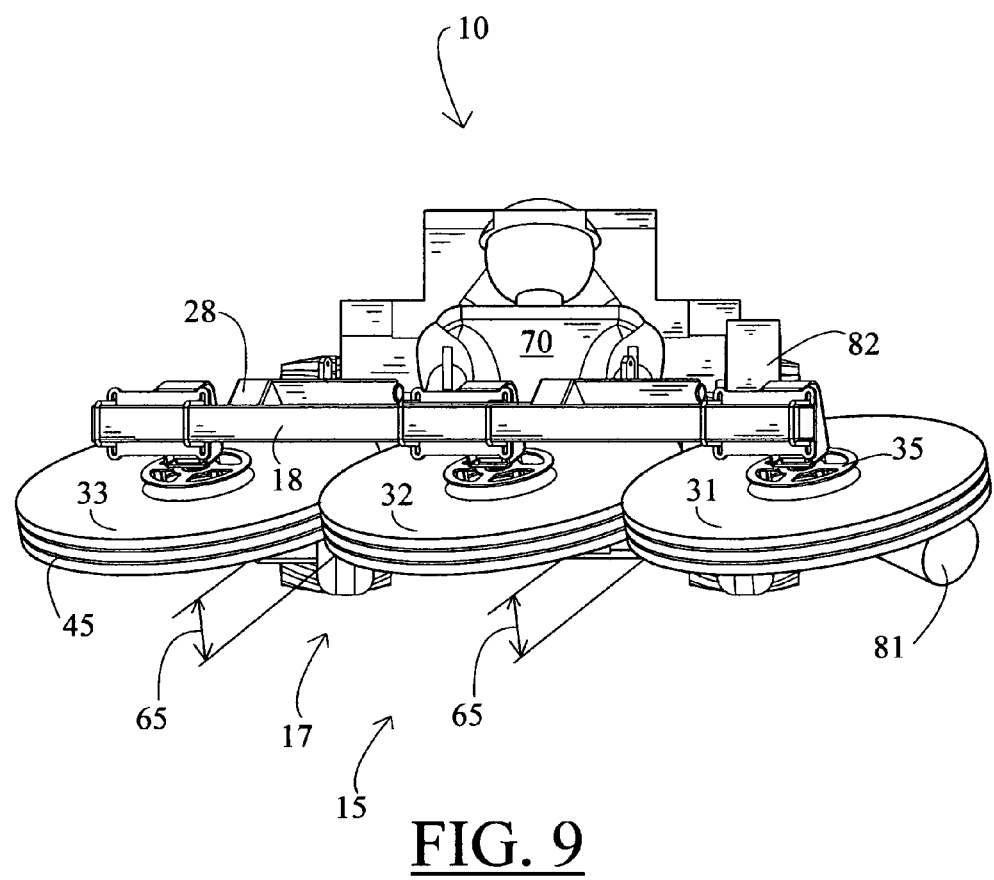
FIG. 9 is a front view of a low-profile sweeper, according to an embodiment of the invention.

Most preferably, the brushes 15 rotate at a "negative tilt" 60, relative to the ground surface 50. The rotation of the brushes defines a "plane of rotation" 63, as shown in FIGS. 5 and 9. For this preferred embodiment, as shown in FIGS. 1 through 9, the plane of rotation is most preferably similar in all of the plurality of rotatable brushes. A key consideration in this embodiment of the present invention is the elimination of conflicting overlap in the bristles 37 of the brushes 15. As the brushes rotate in the common direction of rotation 56, and in the plane of rotation 63, as shown in FIG. 2, the tip ends 47 of the preferred, radially oriented bristles of the first brush 31 are in close proximity to the tip ends of the second brush 32, as first brush and second brush rotate. When the tip ends of adjacent brushes contact each other, the action of the brushes is perturbed or otherwise disrupted, and counter productive.

Figure 3:
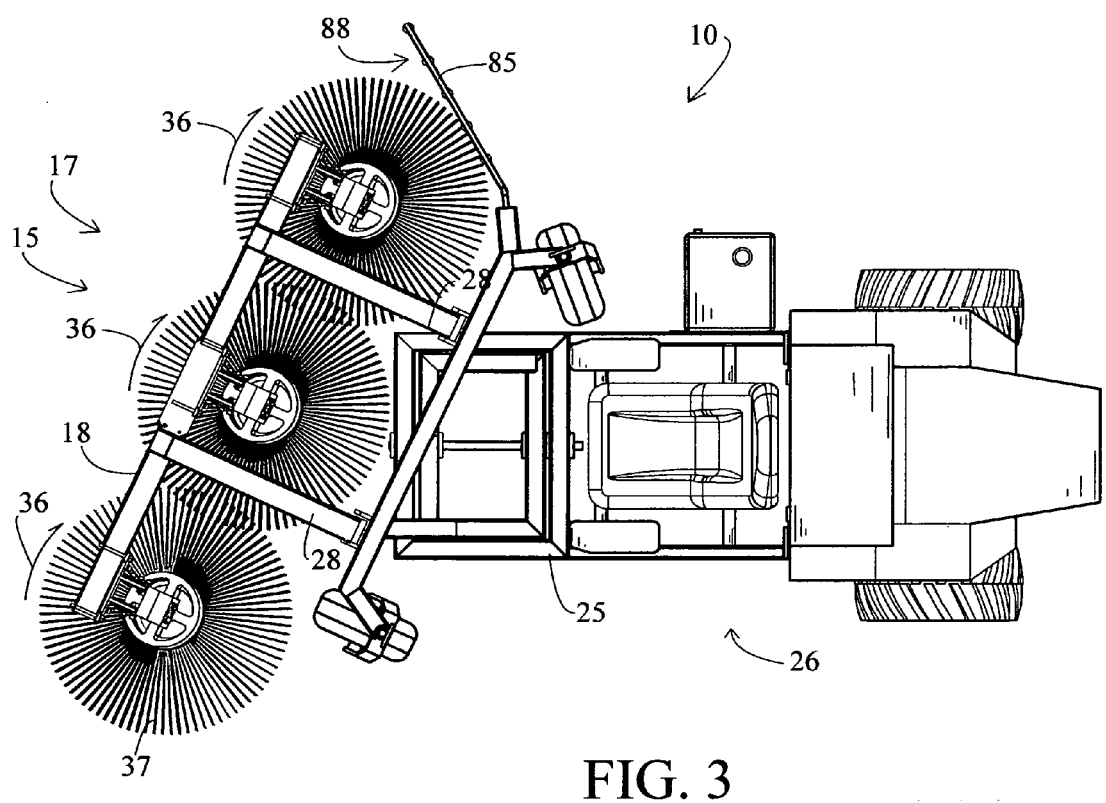
FIG. 3 is a top view of a low-profile sweeper, according to an embodiment of the invention.
Figure 4:
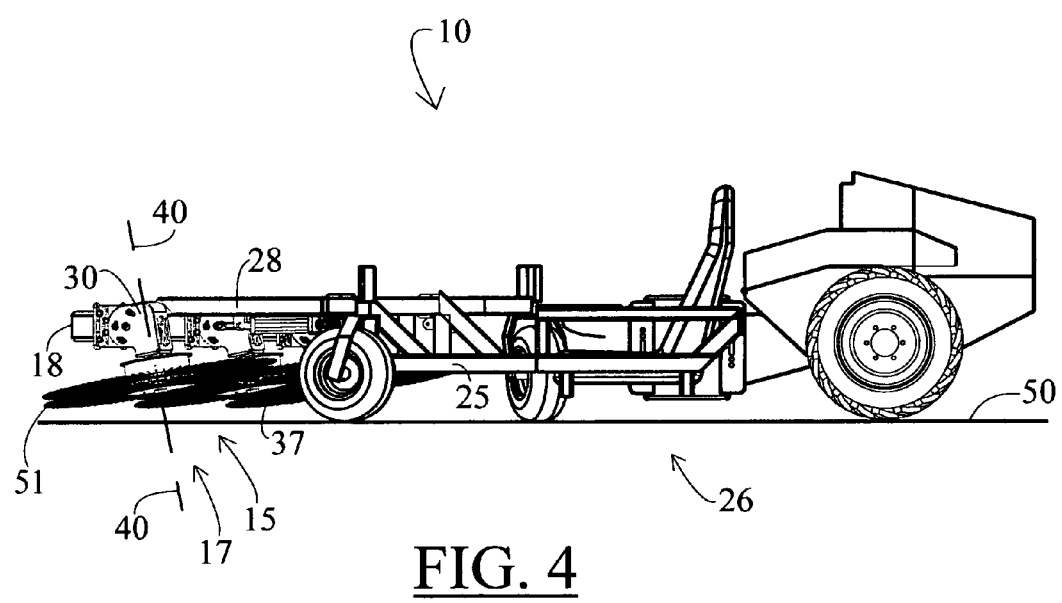
FIG. 4 is a side view of a low-profile sweeper, according to an embodiment of the invention.
Figure 6:
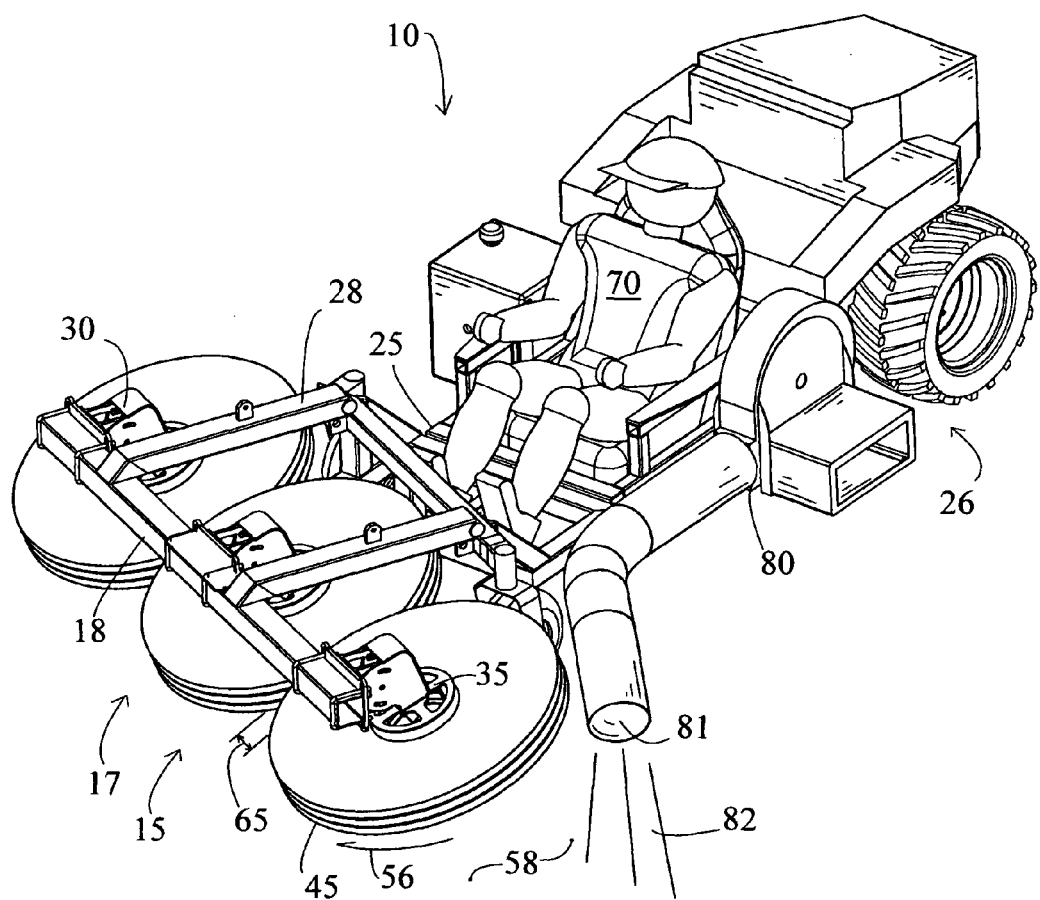
FIG. 6 is a perspective view of a low-profile sweeper, according to an embodiment of the invention.

Most preferably, the plane of rotation 63 is "skewed" for each successive, neighboring brush, so that the brushes 15 appear to overlap in a plan view, as shown in FIG. 3, but are most preferably separate from each other by a "clearance offset" 65 in the plane of rotation, as shown in FIGS. 6 and 9. This skewed orientation of the brushes eliminates a "dead space" or gap, between the brushes, and so prevents any swept material from gathering between the brushes.

Additional deviations from the same plane of rotation 63 by any of the brushes 15 is also beneficial for sweeping along a berm or similar irregularity in the ground surface 50. The brushes preferably dip forward at the leading edge 51 of the tip ends 47, at the negative tilt 60, discussed above. The ideal negative tilt is found when the plane of rotation is somewhat parallel to the ground surface, at an angle of approximately 5 to 35 degrees to the ground surface, and most preferably near approximately 20 degrees from the substantially horizontal plane of the ground surface. The term "approximately" is employed herein throughout, including this detailed description and the claims, with the understanding that is denotes a level of exactitude commensurate with the skill and precision typical for the particular field of endeavor, as applicable. The angle bracket 30, as detailed in FIG. 2 is most preferably adjustable to provide for tilting of the brushes and adjusting each plane of rotation for each brush.

The low-profile sweeper 10, is preferably configured to accommodate irregularities in the ground surface 50 and to easily disengage the low-profile sweeper from the contact area 43. In a preferred embodiment of the present invention, the brushes 15, as mounted upon the brush armature 18, can be raised or lowered by actuating the armature frame 28. The armature frame hingably mounts to the chassis 25 with an armature actuator 67, as shown in FIG. 2, and can be alternatively raised or lowered.

Figure 7:
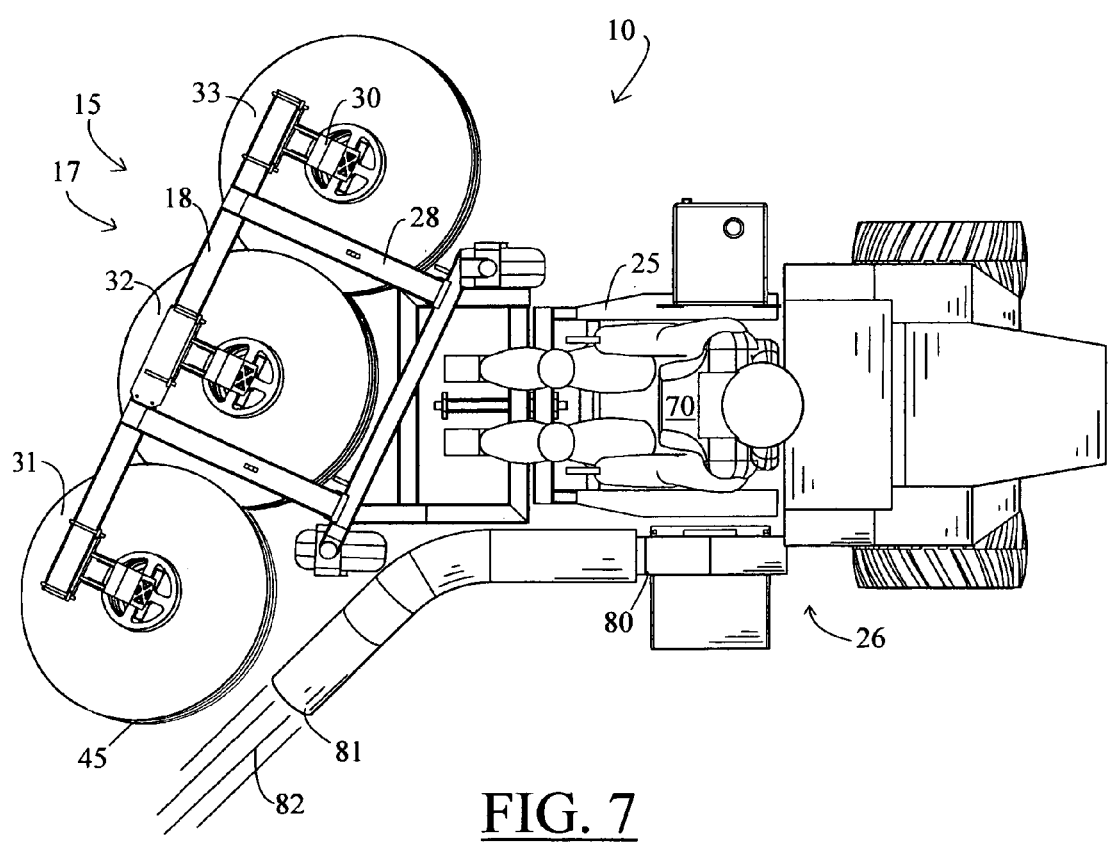
FIG. 7 is a top view of a low-profile sweeper, according to an embodiment of the invention.

The armature actuators 67 are preferably hydraulic and controlled by an operator 70, seated in the low-profile sweeper, as shown in FIGS. 6, 7, and 8. The chassis 25 is movable on the ground surface 50 by action of the steerable drive 26, as also controlled by the operator. The design and configuration of the steerable drive preferably includes an armature frame pivot 72, as shown in FIG. 2, which is also preferably hydraulicly controlled.

The rotation of the brushes 15 is also preferably accomplished by hydraulics. Hydraulic motors are most preferably included within each angle bracket 30 on the brush armature 18. The general configuration and operation of these hydraulic motors and controls are of a conventional design. These conventional controls are known to those skilled in hydraulic actuation and controls. The preferred hydraulic system of control for use with the present invention is powered by a central hydraulic pump, preferably powered by the engine of the low-profile sweeper. The engine, also powering the steerable drive 26, is preferably gas, diesel or propane powered. Alternatively, the hydraulic pump could run by a "power-take-off," as is well known to persons skilled in farming and orchard equipment.

In a preferred alternative embodiment of the present invention, an inside sweep fan 80, simply referred to herein as the fan, can be utilized to aid the action of the brushes 15. As shown in FIGS. 6, 7, 8 and 11, the fan is mounted upon the chassis 25 of the low-profile sweeper 10, and includes an outlet 81 for directing an air stream 82 to the inside sweep area 58. The fan is preferably hydraulic, controlled by the operator 70 and powered by the same central hydraulic system as the brush rotation and the armature actuators 67.

In an additional preferred alternative embodiment of the present invention, a spray bar 85 can be utilized to aid in reducing emissions of fugitive dust 87. As shown in FIG. 2, the spray bar preferably extends from the brush armature 18. And most preferably from the armature frame 28, so that the spray bar raises or lowers with the brushes. Alternatively, the spray bar may be mounted directly to the chassis 25. Most preferably, the spray bar includes a series of nozzles 88, each mounted to direct a spray 89 into the outside sweep area 59. Water is a preferred spray, and is considered effective in reducing potential dust emissions, especially respirable dusts, referred to as "PM-10." Amended water or other dust suppression solutions or surfactants, as known to those skilled in dust abatement, as well as ground or crop treatment solutions known to those skilled in such technologies are considered for use with, or as a substitute for the preferred water spray.

Figure 10:
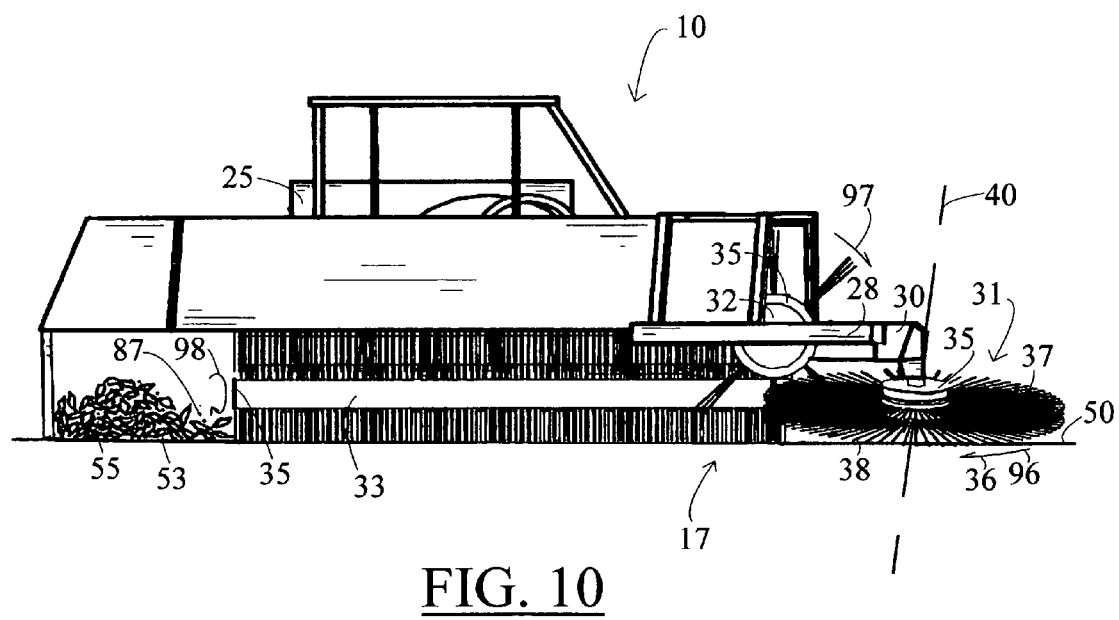
FIG. 10 is a front view of a low-profile sweeper, according to an embodiment of the invention.
Figure 11:
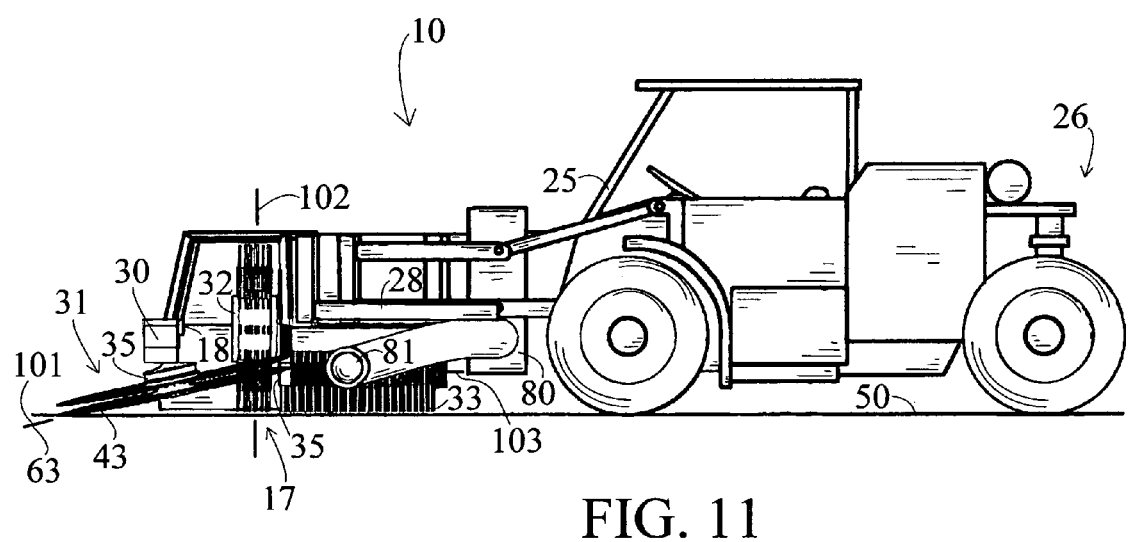
FIG. 11 is a side view of a low-profile sweeper, according to an embodiment of the invention.

In an alternative preferred embodiment of the present invention, as shown in FIGS. 10 and 11, the plurality of rotatable brushes 15 in the low-profile sweeper 10 can be positioned or oriented at approximately 90 degrees or a "right" angle to each other. This positioning facilitates the movement of a harvested material on the ground surface 50, the harvested material preferably tree nuts 53 or a plurality of tree nuts, as discussed previously herein. Further, the low-profile sweeper employs the relative orientations of the brushes to organize these materials into the windrow 55. For the present embodiment the first brush 31 mounts on the brush armature 18. The brush armature mounts to the chassis 25. The chassis includes a steerable drive 26, or similar mechanism for propelling and guiding the low-profile sweeper. As an additional alternative, the chassis and steerable drive can be a tractor supplied by a grower or orchardist and fit with the mechanism of the low profile sweeper.

As detailed in FIG. 10, the plurality of rotatable brushes 15, also referred to herein as "the brushes," can include three rotatable brushes, the first brush 31, the second brush 32 and the third brush 33. The brushes all include a hub 35, or alternatively a spool or reel, centrally located in each brush and rotatably mounted to the armature frame 28. The first brush preferably rotates in a first direction of rotation 96, the second brush preferably rotates in a second direction of rotation 97, and the third brush in a third direction of rotation 98, as also shown in FIG. 10.

For this alternative, the second brush 32 and the third brush 33 of the low profile sweeper 10, are preferably embodied in either a "Model 55 Series Sweeper" or a "Model 75 Series Sweeper," as presently manufactured by Flory Industries, of Salida, Calif., U.S.A. Each brush has the bristle set 38 for contacting the ground surface 50, as each of the brushes rotates. The first brush 31 is rotatably mounted to the brush armature 18, and preferably hydraulically powered with a hydraulic motor. Again, the use of hydraulic systems for powering rotatable components with hydraulic motors is well known to persons skilled in farming and orchard equipment.

For this alternative embodiment, the first brush 31 rotates approximately parallel and in close proximity to the ground surface 50, as modified by the negative tilt 60, in a first plane of rotation 101, to contact the ground surface at the leading edge 51. Most preferably, the first plane of rotation is at the slightly negative tilt, relative to the ground surface. The rotation of each of the plurality of rotatable brushes 15 defines the plane of rotation 63. As shown in FIG. 11, the second plane of rotation 102, as defined for the for the second brush 32, is preferably at approximately a right angle orientation to the first plane of rotation. The third brush 33 rotates in a third plane of rotation 103, preferably at approximately a right angle orientation to the second plane of rotation. As is conventional, the second brush and the third brush rotate to contact the ground surface and move the tree nuts 53, or harvested material from the inside sweep area 58, to the outside sweep area 59, forming the windrow 55. However, with the present invention, the first brush greatly improves recovery of the tree nuts outside the path of the second brush and third brush, and delivery of these hard to reach tree nuts to the second brush, and so to the third brush.

The first brush 31 includes the hub 35, and the hub rotates about an axis in the axis of rotation 40. The axis of rotation is perpendicular to the plane of rotation 63. The hub 35 is centrally located in the first brush and rotatably mounted to the angle bracket 30. The brushes rotate in a direction of rotation 36, as shown in FIG. 10.

For this preferred alternative embodiment of the present invention, the first brush 31 has bristles 37 that are included in the bristle set 38. The bristle set is preferably a narrow stack of conventional, off-the shelf "wafer" brush bristles. Most preferably, a polypropylene wafer set for a standard, three foot diameter "tube broom" is utilized for the bristle set, as manufactured by Three "B" Brush Manufacturing Co., of Lubbock, Tex., U.S.A.

The inventors of the present invention found that the orientation of the bristles 37 in the wafer sets that extend radially from the hub 35, and parallel to the plane of rotation 63, performed exceptionably well with the low-profile sweeper 10. Again, this field performance is far better than conventional, disk shaped "gutter broom" brush bristle sets. Conventional, rotating gutter broom brushes are functionally inoperable in this preferred embodiment of the present invention. Gutter brooms are specially designed for concrete curb scrubbing operations, not the gentle movement of nut sized parcels, as required. The gutter brooms fail to reach to the trunks of trees without damage to the tree trunks. The bristles of a gutter brooms extend downward from a rotating disk. The gutter broom cannot reach the ground surface immediately adjacent to the tree trunks without the rotating disk impacting the tree trunk, often damaging the trunk. Importantly, the gutter broom bristles are specifically configured to scrub the ground surface to backward, relative to the sweeper as it moves, rather than gently flick or move loose material lying on the ground surface forward relative to the sweeper, to form a windrow 55, as accomplished in the present invention. Gutter brooms are also found to be ineffective in moving the propelling materials that require a "skewed" relationship between neighboring brushes, as discussed herein.

For the bristle set 38, any type, configuration or bristle material, with a preferred structure of the bristles 37 that is substantially "radial" in form is most preferred. By radial, the bristles emanate from the hub 35. Any such radial brush design should perform nominally well for use with the low-profile sweeper 10. The bristles may be plastic, metal or a combination of conventional bristle materials. The bristles of the first brush 31, or as simply referred to herein after as the "brush," may be pre-manufactured for use with conventional sweepers, or custom built for the specific use with the present invention. The use of the wafer as the preferred bristle set, with its bristles directed radially from the axis of rotation 40, and parallel to the plane of rotation 63, provides superior material pickup and sweeping characteristics, especially for tree nuts 53 on the ground surface 50. The axis of rotation for the first brush in this embodiment is shown in FIG. 10.

As also shown in FIG. 11, in this alternative preferred embodiment of the present invention, the first brush 31 meet the ground surface 50 at the contact area 43. The contact area is located proximate to the outer perimeter 45 of the brush. The outer perimeter of the brush corresponds to the tip end 47 of the bristle 37. The rotating brush maintains constant contact between contact area and the ground surface with successive bristles, as the brush rotates past the contact area. The contact area is at the leading edge 51, along the outer perimeter of the brush. Any movable item encountered by the rotating bristles, is propelled by the brush in the direction of rotation 36, which is also the first direction of rotation 96, along the outer perimeter of the brush. These items are as most preferred, the harvested material such as tree nuts 53 that have fallen to the ground surface. This alternative embodiment of the low-profile sweeper 10 well suited for the cleaning and sweeping of nuts in nut tree groves or orchards. With the present invention, nuts that have been shaken from the tree, or otherwise fallen to the ground, can be efficiently swept into a windrow 55, typically centered between tree rows. Again, the preferred tree nuts are almonds, but alternatively is walnuts, hazelnuts or filberts, pistachios, or pecans, to name but a few ground harvested nut varieties, as well known to those skilled in nut growing and harvesting.

For this alternative preferred embodiment of the present invention, as shown in FIG. 10, the direction of rotation 36 for the first brush 31 is counter to normally configured sweeping brushed that sweep material rearward and away from the sweeper. Instead the direction of rotation is opposite the conventional debris sweeper and serves to move swept material, such as the tree nuts 53, from an inside sweep area 58, along the outer perimeter 45 of the brushes, which is at the leading edge 51 of the brush, to an outside sweep area 59. As discussed above, any number of rotatable brushes could be employed, with one considered optimal in this embodiment, and two or more rotary brushes in a substantially or approximately parallel configuration considered as an alternative.

Most preferably, the first brush 31 rotates at the negative tilt 60, relative to the ground surface 50. Again, the rotation of the brush defines the plane of rotation 63, as shown in FIG. 11, for this embodiment. The plane of rotation is approximately parallel to the ground surface, as modified by the negative tilt. Additional deviations from the same plane of rotation by the brush is also beneficial for sweeping along a berm or similar irregularity in the ground surface 50, as is typically found near a tree trunk. The brush preferably dip forward at the leading edge 51, near the tip ends 47, at the negative tilt. The angle bracket 30, as shown in FIG. 10 for this embodiment is most preferably adjustable to provide for tilting of the brush and adjusting the plane of rotation for the brush.

The low-profile sweeper 10, is preferably configured to accommodate irregularities in the ground surface 50 and to easily disengage the low-profile sweeper from the contact area 43. In a preferred embodiment of the present invention, the first brush 31, as mounted upon the brush armature 18, can be raised or lowered by actuating the armature frame 28, as preferably accomplished by conventional hydraulics.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A low-profile sweeper that moves forward along a longitudinal axis comprising:
   a chassis, the chassis having a steerable drive, and the chassis movable on a ground surface by action of the steerable drive;
   a plurality of rotatable brushes, each of the plurality of rotatable brushes having a bristle set, the bristle sets of the plurality of rotatable brushes for contacting the ground surface as each of the plurality of rotatable brushes rotates;
   the plurality of rotatable brushes including minimum of a first brush, a second brush, and a third brush;
   the first brush rotatable in a first plane of rotation, the second brush rotatable in a second plane of rotation, and the third brush rotatable in a third plane of rotation;
   wherein an axis of rotation for the third brush is parallel to the longitudinal axis of the low profile sweeper;
   the first plane of rotation in a generally close, parallel proximity to the ground surface;
   the first brush rotatable in the first plane of rotation to contact and move a plurality of tree nuts into contact with the second brush, the plurality of tree nuts dispersed upon the ground surface;
   the second brush rotatable in the second plane of rotation to contact and move the plurality of tree nuts into contact with the third brush;
   the third brush rotatable in the third plane of rotation to contact and move the plurality of tree nuts into a contact with the third brush to move the plurality of tree nuts to form a windrow; and
   the second plane of rotation is oriented approximately right angle to the first plane of rotation, the third plane of rotation is oriented approximately right angle to both the first plane of rotation and the second plane of rotation, and the second plane of rotation is oriented at approximately right angle to the ground surface.

2. A low-profile sweeper that moves forward along a longitudinal axis comprising:
   a chassis, the chassis having a steerable drive, and the chassis movable on a ground surface by action of the steerable drive;
   a plurality of rotatable brushes, each of the plurality of rotatable brushes having a bristle set, the bristle sets of the plurality of rotatable brushes for contacting the ground surface as each of the plurality of rotatable brushes rotates;
   the plurality of rotatable brushes including minimum of a first brush, a second brush, and a third brush;
   the first brush rotatable in a first plane of rotation, the second brush rotatable in a second plane of rotation, and the third brush rotatable in a third plane of rotation;
   wherein an axis of rotation for the third brush is parallel to the longitudinal axis of the low profile sweeper;
   the first plane of rotation in approximately a close, parallel proximity to the ground surface, the second plane of rotation at approximately right angle to the first plane of rotation, the third plane of rotation at approximately right angle to both the first plane of rotation and the second plane of rotation, and the second plane of rotation is oriented at approximately right angle to the ground surface;
   the first brush having first bristles, the second brush having second bristles and the third brush having third bristles, the first bristles closely proximate to the second bristles and the second bristles closely proximate to the third bristles;
   the first brush rotatable in the first plane of rotation to contact and move a plurality of tree nuts into contact with the second brush, the plurality of tree nuts dispersed upon the ground surface;
   the second brush rotatable in the second plane of rotation to contact and move the plurality of tree nuts into contact with the third brush; and
   the third brush rotatable in the third plane of rotation to contact and move the plurality of tree nuts into a contact with the third brush to move the plurality of tree nuts into a windrow.

3. A low-profile sweeper that moves forward along a longitudinal axis comprising:
   a chassis, the chassis having a steerable drive, and the chassis movable on a ground surface by action of the steerable drive;
   a first rotatable brush, the first rotatable brush having a first bristle set, the first bristle set of the first rotatable brush for contacting the ground surface as the first rotatable brush rotates;
   the first rotatable brush rotatable in a first plane of rotation;
   the first plane of rotation in a generally close, parallel proximity to the ground surface;
   the first rotatable brush rotatable in the first plane of rotation to contact and move a plurality of tree nuts, the plurality of tree nuts dispersed upon the ground surface;
   the first rotatable brush including a first hub;
   the first hub rotatable about a first axis,
   the first axis perpendicular to the first plane of rotation;
   the first bristle set including a first plurality of bristles, the first plurality of bristles radially extend from the first hub, and extend substantially parallel to the first plane of rotation;
   a second rotatable brush, the second rotatable brush including a second hub;
   the second hub rotatable about a second axis;
   the second rotatable brush rotatable in a second plane of rotation;
   the second axis perpendicular to the second plane of rotation;
   the second rotatable brush including a second bristle set, the second bristle set of the second brush for contacting the ground surface as the second brush rotates;
   the second plane of rotation at an approximate right angle to the first plane of rotation, and the second bristle set located in close proximity to the first bristle set;
   the second brush rotatable in the second plane of rotation to contact and move the plurality of tree nuts received from the first brush;
   the second bristle set including a second plurality of bristles, the second plurality of bristles radially extend from the second hub, and extend substantially parallel to the second plane of rotation;
   a third rotatable brush, the third rotatable brush including a third hub;
   the third hub rotatable about a third axis that is parallel to the longitudinal axis of the low profile sweeper;

the third rotatable brush rotatable in a third plane of rotation;

the third axis perpendicular to the third plane of rotation;

the third rotatable brush including a third bristle set, the third bristle set of the third brush for contacting the ground surface as the second brush rotates;

the third plane of rotation at an approximate right angle to the second plane of rotation and at an approximate right angle to the first plane of rotation, and the third bristle set located in close proximity to the second bristle set;

the third brush rotatable in the third plane of rotation to contact and move the plurality of tree nuts received from the second brush; and the third bristle set including a third plurality of bristles, the third plurality of bristles radially extend from the third hub, and extend substantially parallel to the third plane of rotation.

* * * * *